Figure 1:
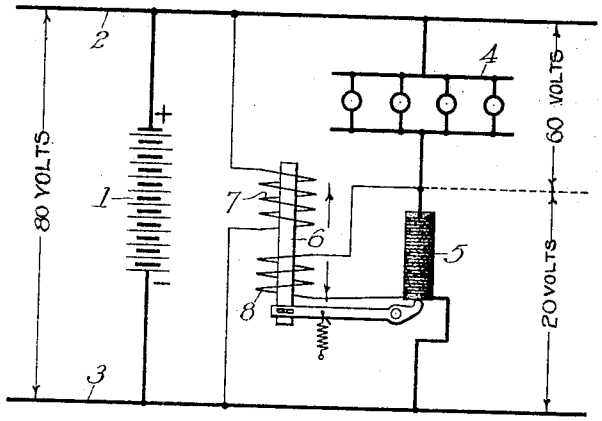

W. A. TURBAYNE.
ELECTRIC REGULATOR.
APPLICATION FILED APR. 13, 1912.

1,236,630.

Patented Aug. 14, 1917.
2 SHEETS—SHEET 1.

Witnesses:
Robert H. Weir
Geo. B. Jones

Inventor
William A. Turbayne
By Edwin B. H. Tower Jr.
Atty.

UNITED STATES PATENT OFFICE.

WILLIAM A. TURBAYNE, OF BUFFALO, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

ELECTRIC REGULATOR.

1,236,630.  Specification of Letters Patent.  Patented Aug. 14, 1917.

Application filed April 13, 1912. Serial No. 690,574.

*To all whom it may concern:*

Be it known that I, WILLIAM A. TURBAYNE, a citizen of the United States, residing at Buffalo, in the county of Erie and State of New York, have invented new and useful Improvements in Electric Regulators, of which the following is a full, clear, concise, and exact description, reference being had to the accompanying drawing, forming a part of this specification.

My invention relates to automatic electric regulators.

One of the objects of my invention is to provide an improved regulator for maintaining constant voltage. Another object is to enable the main regulating winding to be connected across the circuit between the source of current and the regulating medium.

For the purpose of disclosing my invention I have illustrated in the accompanying drawings three forms of regulators. Other forms may, of course, be devised which embody the principles of my invention.

The regulator is for the purpose of holding constant electrical conditions on a circuit to be regulated, when such circuit is supplied from a variable source. It is sometimes undesirable to connect the controlling winding directly in the circuit to be regulated. In this event, one winding may be connected to respond to variations in the source and a compensating winding introduced which, by responding to the regulating effect produced by the regulating medium, will compensate for the varying drop occasioned by said medium.

The four figures in the drawings are all diagrammatic.

Figure 1 shows a regulator for maintaining constant voltage on a translating circuit. Current may be supplied to said circuit from any suitable source. For example, it may be supplied by a storage battery and a variable speed generator such as used in car lighting systems. In the drawings I have illustrated a storage battery 1 which is connected across the supply circuit or mains 2, 3. The battery may be assumed to be charged by a variable speed generator, not shown. A lamp circuit 4 is connected across the mains 2, 3 on the side of the battery away from the generator. This lamp circuit may be taken to represent any translating circuit.

Figure 2:
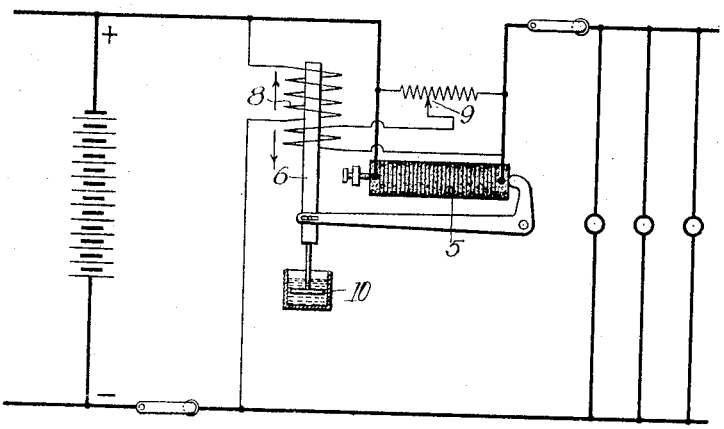
Figure 3:
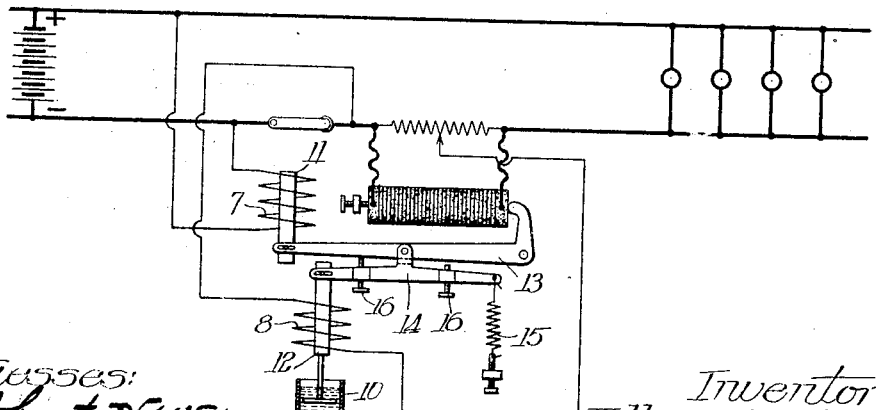

Any suitable regulating medium may be provided to offset the variations in the voltage of the supply circuit, which would otherwise be impressed on the translating circuit. The regulating medium may be either a counter-electromotive device, a variable resistance or other means, connected in series with the translating circuit. In Figs. 1, 2 and 3 I have illustrated a variable resistance for performing this function, having the form of a variable pressure rheostat 5. The resistance is varied by the movement of the plunger 6, which is controlled by a controlling winding or solenoid comprising preferably, in a unitary structure, a main regulating winding or voltage coil 7 connected across the supply circuit and an auxiliary winding 8 connected in a shunt circuit around the variable resistance 5. Suitable mechanical connections of a well known form are provided between the plunger 6 and the variable resistance 5. When the plunger 6 is elevated in response to the energization of the controlling winding the resistance 5 is increased. When the energization of the controlling winding decreases the resistance 5 also decreases.

The voltage winding 7 and the auxiliary winding 8 are arranged to act differentially. The voltage winding 7 responds to a rise in voltage on the supply circuit, and if unopposed would continue to increase said resistance 5 as said voltage continued to increase. The increasing value of the resistance 5 would cause an increased voltage drop across said resistance. The auxiliary winding 8, being connected around said resistance 5, however, responds to this rise in voltage developed across said resistance and therefore exerts an opposing effect which counteracts the effect of the voltage winding 7. These two windings are so designed that the resulting effect produced by the controlling winding as a whole, on the variable resistance 5, is to regulate the latter so as to hold the voltage impressed on the translation circuit at the desired value. For the purpose of illustration I have assumed that it is desirable to prevent the voltage on the translating circuit from exceeding 60 volts, and that the voltage of the supply circuit may at times reach as high a value as 80 volts. Under these circumstances, the voltage drop developed across the resistance 5 would be 20 volts, and the regulator would operate to prevent an increase in the voltage of the translation circuit above 60 volts, regardless of the increased voltage on the supply circuit. These values have been indicated on the drawings simply by way of illustrating certain voltage values that it might be necessary or desirable to attain in car lighting systems. It is apparent, of course, that the regulator may be designed to meet widely varying conditions.

Fig. 2 illustrates a regulator similar in general construction and operation to that described in connection with Fig. 1, but provided with an adjustable shunt 9 around the variable resistance 5, whereby the effectiveness of the auxiliary winding 8 may be varied to meet different requirements. A dash pot 10 of well known form is provided to steady the movement of the plunger 6. Such a dash pot, of course, may also be used in connection with the arrangement shown in Fig. 1.

Fig. 3 illustrates a regulator having a voltage winding 7 and an auxiliary winding 8 connected in the manner previously described. These windings, however, are provided with separate plungers 11 and 12. The plunger 11 controls directly the movement of the bell crank lever 13, and the plunger 12 acts to offset said movement and is connected to said bell crank lever by an auxiliary lever 14, pivoted preferably at the middle to said bell crank lever. The pull of the plunger 12 is opposed by a suitable spring 15, and the pivotal movement of the lever 14 is restricted by suitable adjusting screws 16. The general result attained by this construction is the same as the result previously described, namely, the regulation of the translating circuit to prevent an excessive voltage from being impressed thereon. The mechanical connections, however, permit the main bell crank lever a certain amount of unrestricted or free movement before being damped or retarded by the dash pot 10. This is done to overcome the static friction. By the adjustment of the thumb screws 16 the amount of this free play may be adjusted as desired or may be eliminated altogether.

Figure 4:
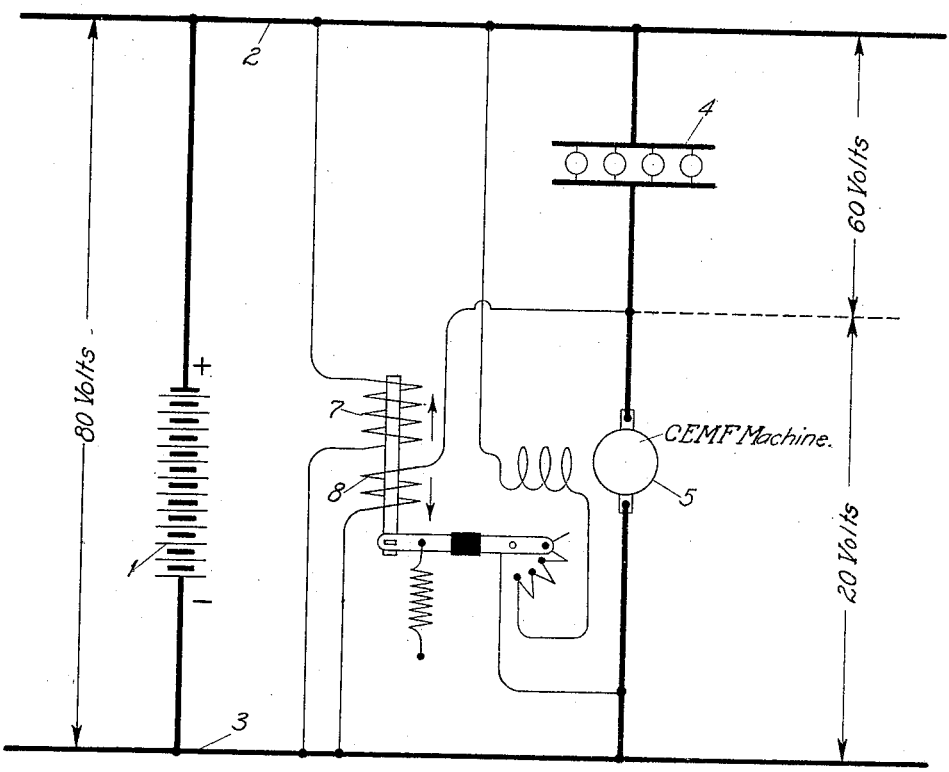

Fig. 4 illustrates a system similar in most respects to that shown in Fig. 1, but illustrating how a counter E. M. F. device may be used with the present invention. In said figure, the counter E. M. F. device is intended to be broadly indicative of any desired counter E. M. F. device.

The figures have been described assuming variable voltage across the mains 2, 3, and a constant resistance in the translation circuit. It is obvious, however, that the principle remains unchanged and that the present invention will operate in just the same way if the resistance of the translation circuit is varied. For instance, if the resistance of the translation circuit is decreased, as by turning on more lamps, the voltage across said translation circuit would tend to fall, while the current through the translation circuit would rise. A corresponding increase in the drop in differential coil 8 would occur, resulting in a decrease in the effect of the medium 5, bringing the translation circuit voltage back to normal.

It is to be understood that the above four forms of regulators have been described merely as typical embodiments of the various features of the invention and that other embodiments may be devised which fall within the scope of the invention. Accordingly, I do not desire to limit myself to the various details of construction or arrangement of parts illustrated and described, but desire to cover in the appended claims suitable equivalent means for accomplishing the desired result.

What I claim as new and desire to secure by Letters Patent of the United States is:

1. A source of current, a circuit to be regulated and a regulator therefor having a regulating medium connected in series in said circuit, and a controlling winding therefor, said controlling winding consisting of a main regulating winding and an auxiliary winding having an opposing effect proportional to the voltage across said medium, said main winding being connected across said circuit between said regulating medium and the source of current.

2. An electrical system of distribution including a supply circuit and a translating circuit and an electric regulator for the translating circuit having a variable resistance connected in series with said translating circuit, a voltage responsive coil connected across the supply circuit on the opposite side of said variable resistance from said translating circuit, and an auxiliary coil having an opposing effect connected in a shunt circuit around said variable resistance, each of said coils acting to control said variable resistance.

3. An electric regulator having a variable resistance connected in series with a translating circuit, a voltage responsive coil connected across the supply circuit on the opposite side of said variable resistance from said translating circuit, and an auxiliary coil connected in a shunt circuit around said variable resistance, said coils acting differentially to control said variable resistance.

4. An electric regulator having a variable resistance connected in series with a translating circuit, a voltage responsive coil connected across the supply circuit on the opposite side of said variable resistance from said translating circuit, and an auxiliary coil connected in a shunt circuit around said variable resistance, said voltage coil tending to vary said resistance in accordance with variations in voltage in the supply circuit, and said auxiliary coil opposing said tendency in accordance with the voltage drop developed across said variable resistance.

5. An automatic electric regulator comprising a variable pressure rheostat connected in series with a translating circuit, a voltage responsive solenoid connected across the supply mains between said rheostat and the source of current, a plunger for said solenoid, a bell crank lever having one end connected thereto and having the other end bearing against said rheostat to vary the resistance thereof, an auxiliary lever pivoted to said bell crank lever with means for limiting its pivotal movement, a spring secured to one end of said auxiliary lever and a plunger secured to the end thereof, an auxiliary solenoid for operating said plunger, said auxiliary solenoid being connected around said variable pressure rheostat through an adjustable shunt, whereby said voltage responsive solenoid responds to an increase in the voltage of said supply mains and tends to increase the resistance of said rheostat, and whereby said auxiliary solenoid is energized in accordance with the voltage drop developed across said rheostat and opposes the tendency of said first solenoid, to maintain at a constant value the voltage impressed on said translating circuit.

6. A system of electrical distribution having a variable supply circuit and a circuit supplied thereby, and means to regulate said supplied circuit, said means having an operating winding connected to respond to variations in said supply circuit and having a compensating winding exerting an opposite effect in proportion to changes in the regulating effect of said regulating means.

7. A regulator including a compressible rheostat, an operating lever therefor, a coil for operating said lever, a second coil exerting an influence on said lever opposed to the effect of said first coil, and adjustable means for determining the point in the operation of said rheostat at which said second coil shall become effective to oppose said first coil.

8. A regulator for car lighting apparatus including a rheostat, an operating coil therefor, and a second coil exerting an opposing effect on said rheostat and connected to respond to variations in the voltage drop occasioned by said rheostat.

9. A regulator for car lighting apparatus including a regulating medium, an operating coil therefor, and a second coil exerting an opposing effect on said medium, said second coil being connected to respond to variations in the voltage drop occasioned by said medium, and means for adjusting the relative strengths of said coils.

10. A regulator for car lighting apparatus including a regulating medium, an operating coil therefor, and a second coil exerting an opposing effect on said medium, said second coil being connected to respond to variations in the voltage drop occasioned by said medium, and means for determining the point at which said second coil shall become effective to oppose the effect of said first coil.

In witness whereof, I have hereunto subscribed my name in the presence of two witnesses.

WILLIAM A. TURBAYNE.

Witnesses:
F. J. CALLAHAN,
C. E. MEAD.

Copies of this patent may be obtained for five cents each, by addressing the "Commissioner of Patents, Washington, D. C."